United States Patent
Fisher et al.

(10) Patent No.: US 9,106,175 B2
(45) Date of Patent: Aug. 11, 2015

(54) DIAGNOSTIC SYSTEM AND METHOD FOR AN ELECTRIC POWER STEERING SYSTEM

(75) Inventors: Paul Fisher, Saginaw, MI (US); Christian E. Ross, Freeland, MI (US); Mohammad S. Islam, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 914 days.

(21) Appl. No.: 13/192,867

(22) Filed: Jul. 28, 2011

(65) Prior Publication Data

US 2012/0130674 A1    May 24, 2012

Related U.S. Application Data

(60) Provisional application No. 61/416,671, filed on Nov. 23, 2010.

(51) Int. Cl.
*H02P 29/02* (2006.01)

(52) U.S. Cl.
CPC .................................. *H02P 29/021* (2013.01)

(58) Field of Classification Search
USPC ................... 701/41, 42, 43; 318/54, 65, 434; 324/177, 143, 765.01
See application file for complete search history.

(56) References Cited

U.S. PATENT DOCUMENTS

| | | | |
|---|---|---|---|
| 6,271,637 B1 * | 8/2001 | Kushion | 318/434 |
| 6,389,338 B1 | 5/2002 | Chandy et al. | |
| 6,535,805 B2 | 3/2003 | Amberkar et al. | |
| 2003/0067243 A1 * | 4/2003 | Hollenbeck et al. | 310/254 |
| 2003/0218458 A1 * | 11/2003 | Seger et al. | 324/303 |
| 2009/0026994 A1 * | 1/2009 | Namuduri et al. | 318/565 |
| 2009/0112403 A1 * | 4/2009 | Wittig et al. | 701/41 |
| 2009/0145684 A1 * | 6/2009 | Sherwin | 180/410 |
| 2010/0057299 A1 * | 3/2010 | Burgdorf et al. | 701/42 |
| 2011/0282552 A1 * | 11/2011 | Gebregergis et al. | 701/42 |

* cited by examiner

*Primary Examiner* — Mischita Henson
*Assistant Examiner* — Lisa Peters
(74) *Attorney, Agent, or Firm* — Cantor Colburn LLP

(57) ABSTRACT

A diagnostic system and method for an electric power steering system are provided. The diagnostic system includes a first microprocessor that determines a first relative position value indicating the relative rotational position of the rotatable shaft at the first time based on the signals from first and second position sensors. A second microprocessor determines a second relative position value indicating the relative rotational position of the rotatable shaft at the first time based on the signals from third and fourth position sensors. The first microprocessor determines whether the first relative position value is an acceptable value based on a difference between the first relative position value and the second relative position value.

13 Claims, 4 Drawing Sheets

_(1)_

DIAGNOSTIC SYSTEM AND METHOD FOR AN ELECTRIC POWER STEERING SYSTEM

CROSS-REFERENCES TO RELATED APPLICATIONS

This patent application claims priority to U.S. Provisional Patent Application Ser. No. 61/416,671 filed Nov. 23, 2010, which is incorporated herein by reference in its entirety.

FIELD OF THE INVENTION

The subject invention relates to a diagnostic system and a diagnostic method for an electric power steering system.

BACKGROUND

Position sensors have been utilized to determine a motor position. However, the position sensors may have degraded operation.

Accordingly, it is desirable to provide a diagnostic system for an electronic power steering system that detects degraded position sensors.

SUMMARY OF THE INVENTION

A diagnostic system for an electric power steering system in accordance with an exemplary embodiment is provided. The diagnostic system includes a first microprocessor configured to receive first and second signals from first and second position sensors, respectively, disposed in a motor of the electric power steering system. The first and second signals are indicative of a relative rotational position of a magnet on a rotatable shaft of the motor. The first microprocessor is further configured to determine a first relative position value indicating the relative rotational position of the rotatable shaft at the first time based on the first and second signals. The diagnostic system further includes third and fourth position sensors disposed proximate to the rotatable shaft and offset from the first and second position sensors. The third and fourth position sensors are configured to generate third and fourth signals, respectively, indicative of the relative rotational position of the magnet on the rotatable shaft. The diagnostic system further includes a second microprocessor configured to receive the third and fourth signals and to determine a second relative position value indicating the relative rotational position of the rotatable shaft at the first time based on the third and fourth signals. The second microprocessor is further configured to send the second relative position value to the first microprocessor. The first microprocessor is further configured to determine a difference between the first relative position value and the second relative position value. The first microprocessor is further configured to store a diagnostic value in a memory device indicative of whether the second relative position value is acceptable based on the difference between the first relative position value and the second relative position value.

A diagnostic method for an electric power steering system in accordance with another exemplary embodiment is provided. The method includes receiving first and second signals from first and second position sensors, respectively, disposed in a motor of the electric power steering system, utilizing a first microprocessor. The first and second signals are indicative of a relative rotational position of a magnet on a rotatable shaft of the motor. The method further includes determining a first relative position value indicating the relative rotational position of the rotatable shaft at the first time based on the first and second signals utilizing the first microprocessor. The method further includes generating third and fourth signals from third and fourth position sensors, respectively, disposed proximate to the rotatable shaft and offset from the first and second position sensors. The third and fourth signals are indicative of the relative rotational position of the magnet on the rotatable shaft. The method further includes receiving the third and fourth signals at a second microprocessor and determining a second relative position value indicating the relative rotational position of the rotatable shaft at the first time based on the third and fourth signals, utilizing the second microprocessor. The method further includes sending the second relative position value from the second microprocessor to the first microprocessor. The method further includes determining a difference between the first relative position value and the second relative position value, utilizing the first microprocessor. The method further includes storing a diagnostic value in a memory device indicative of whether the second relative position value is acceptable based on the difference between the first relative position value and the second relative position value, utilizing the first microprocessor.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
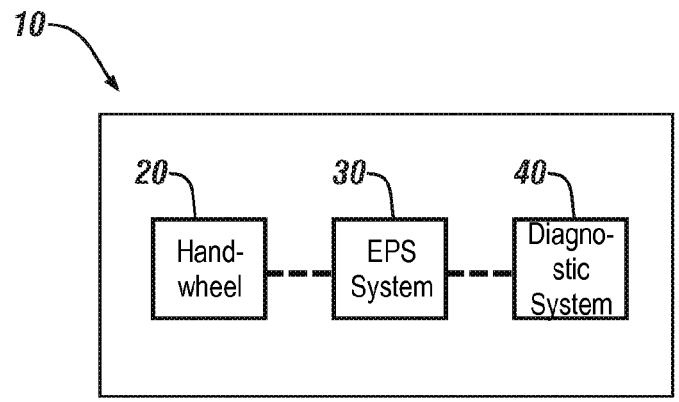
FIG. 1 is a block diagram of a vehicle having a handwheel, an electric power steering system, and a diagnostic system in accordance with an exemplary embodiment.
Figure 2:
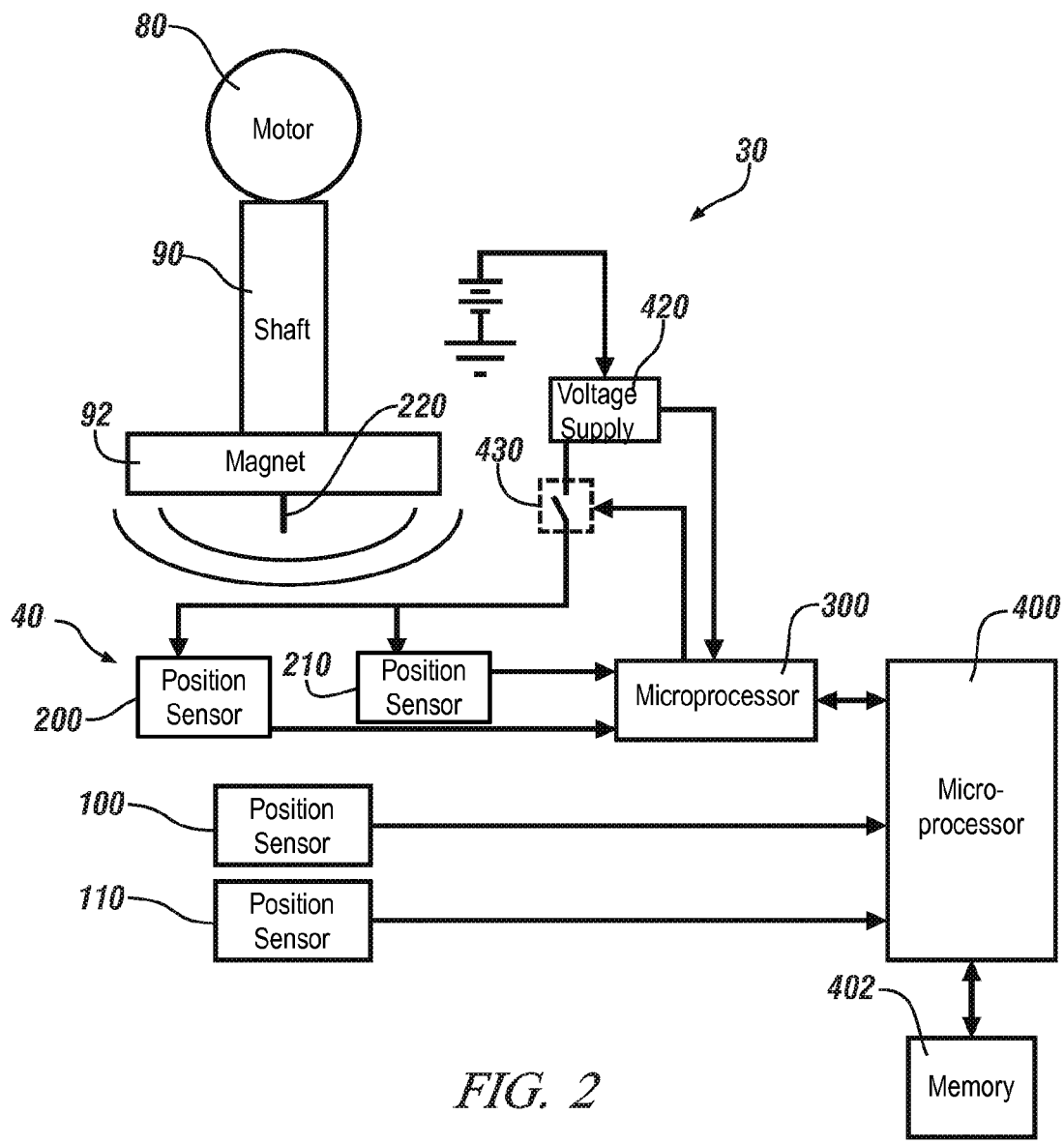
FIG. 2 is a block diagram of the electric power steering system and the diagnostic system of FIG. 1.

Referring to FIGS. 1 and 2, a vehicle 10 having a handwheel 20, an electric power steering system 30, and a diagnostic system 40 in accordance with an exemplary embodiment is illustrated.

The handwheel 20 is operably coupled to the electric power steering system 30. Rotation of the handwheel 20 induces the electric power steering system 30 to cause rotation of a rotatable motor shaft 90 operably coupled to a rack-and-pinion assembly to move an operational position of vehicle wheels.

Figure 3:
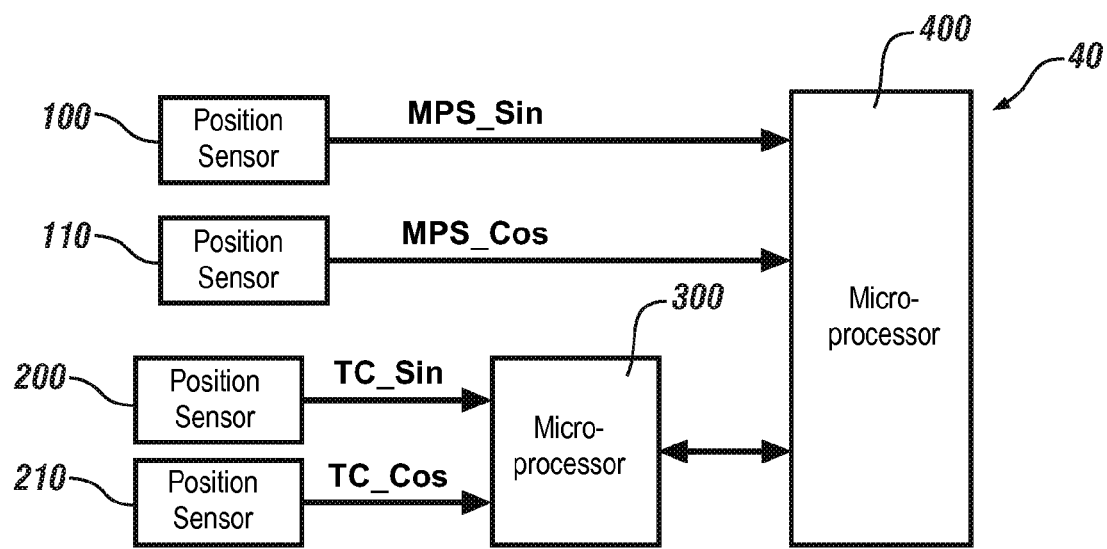
FIG. 3 is a block diagram of a portion of the diagnostic system of FIG. 1.
Figure 4:
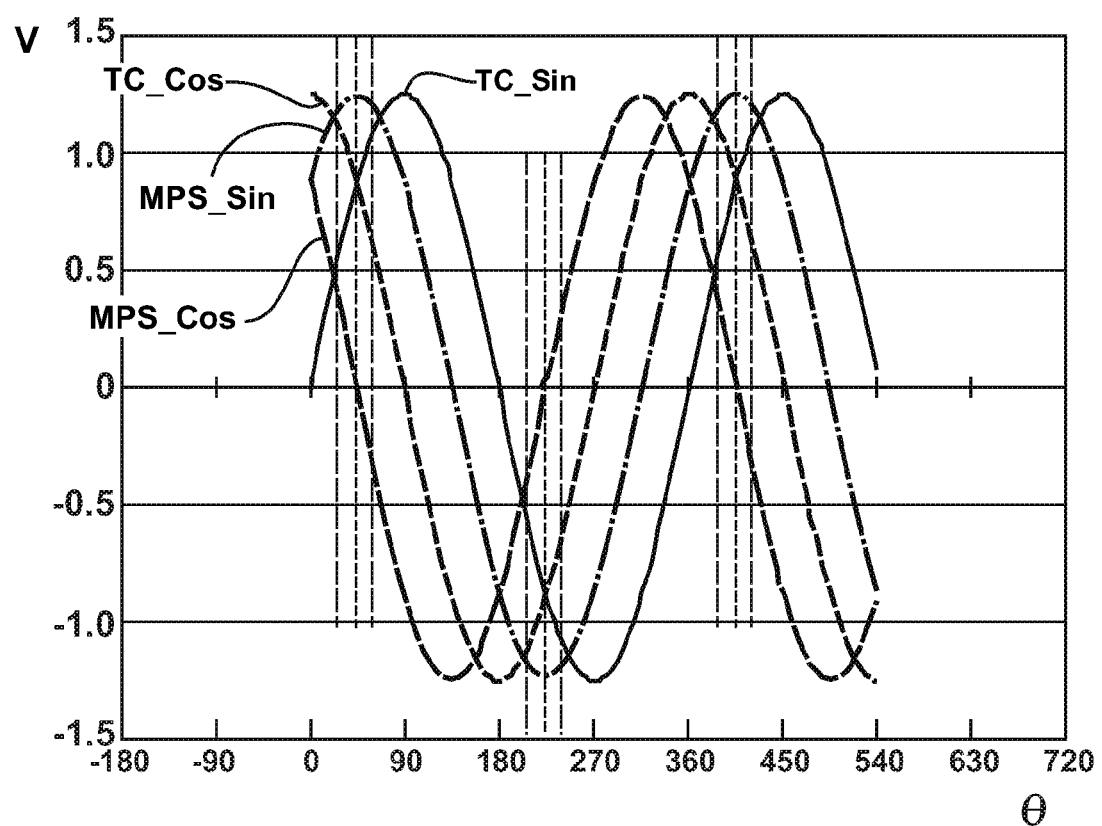
FIG. 4 is a schematic of output signals generated by position sensors utilized in the diagnostic system of FIG. 3.

Referring to FIGS. 2-4, the electric power steering system 30 includes a motor 80 having a rotatable shaft 90, a magnet 92 disposed on the shaft 90, first and second position sensors 100, 110, and a first microprocessor 400. The first microprocessor 400 is also part of the diagnostic system 40. In one embodiment, the rotatable shaft 90 is operably coupled via a gear assembly to a rack-and-pinion assembly for controlling an operational position of vehicle wheels.

The first microprocessor 400 is configured to receive first and second signals (MPS_Sin, MPS_Cos) from first and second position sensors 100, 110, respectively, disposed in the motor 80 of the electric power steering system 30. The first and second signals are indicative of a relative rotational position of the magnet 92 on the rotatable shaft 90 of the motor 80. The first microprocessor 400 is further configured to determine a first relative position value (P1) indicating the relative rotational position of the rotatable shaft 90 at the first time based on the first and second signals. In one exemplary embodiment, the first and second position sensors 100, 110 are Hall effect sensors. Of course, in alternative embodiments other position sensors known to those skilled in art could be utilized.

The diagnostic system 40 includes third and fourth position sensors 200, 210, a second microprocessor 300, the first microprocessor 400, a voltage supply 420 and a controllable switch 430. The diagnostic system 40 is provided to determine whether the third and fourth position sensors 200, 210 are outputting acceptable position signals or degraded position signals. In particular, the diagnostic system 40 determines a difference between a relative rotational position value of the shaft 90 determined from signals from the first and second position sensors 100, 110, and a second relative rotational position value of the shaft 90 determined from signals from the third and fourth position sensors 200, 210. If a difference between the first and second relative position values is less than a threshold value, the second relative position value is an acceptable value as will be explained in greater detail below. Otherwise, the second relative position value is not an acceptable value as will be explained in greater detail below.

The third and fourth position sensors 200, 210 are disposed proximate to the rotatable shaft 90 and angularly offset from the first and second position sensors 100, 110 relative to an axis 220 of the motor 80. The microprocessor 300 is configured to generate a control signal to induce the switch 430 to have a closed operational position for supplying an operational voltage from the voltage supply 420 to the positions sensors 200, 210. Thereafter, when the third and fourth position sensors 200, 210 are activated, the position sensors 200, 210 are configured to generate the third and fourth signals (TC_Sin, TC_Cos), respectively, indicative of the relative rotational position of the magnet 92 on the rotatable shaft 90. In one exemplary embodiment shown in FIG. 5, the third and fourth position sensors 200, 210 are disposed 90 degrees apart from one another about a central axis 220 of the rotatable shaft 90. Of course, the sensors 200, 210 could be disposed at other angles relative to the central axis depending upon a desired application.

The second microprocessor 300 is configured to receive the third and fourth signals from the third and fourth position sensors 200, 210 and to determine a second relative position value (P2) indicating the relative rotational position of the rotatable shaft 90 at the first time based on the third and fourth signals. The second microprocessor 300 is further configured to send the second relative position value to the first microprocessor 400.

The first microprocessor 400 is configured to determine whether the second relative position value (P2) is an acceptable value based on a difference between the first relative position value (P1) and the second relative position value (P2). In particular, the first microprocessor 400 determines that the second relative position value (P2) is an acceptable value if an absolute value of the calculated difference (e.g., absolute value (P1-P2)) is less than a threshold value. Alternately, the first microprocessor 400 determines that second relative position value (P2) is not an acceptable value if an absolute value of the calculated difference is greater than or equal to the threshold value. It should be noted that there will typically be an angular offset between the first relative position value (P1) and the second relative position value (P2), due to the physical placement of the first and second position sensors 100, 110, 200, 210 which will be discussed in greater detail below.

Referring to FIGS. 3 and 4, in one exemplary embodiment, the first, second, third, and fourth position sensors 100, 110, 200, 210 output the first, second, third, and fourth signals MPS_Sin, MPS_Cos, TC_Sin, TC_Cos, respectively, as illustrated.

Figure 5:
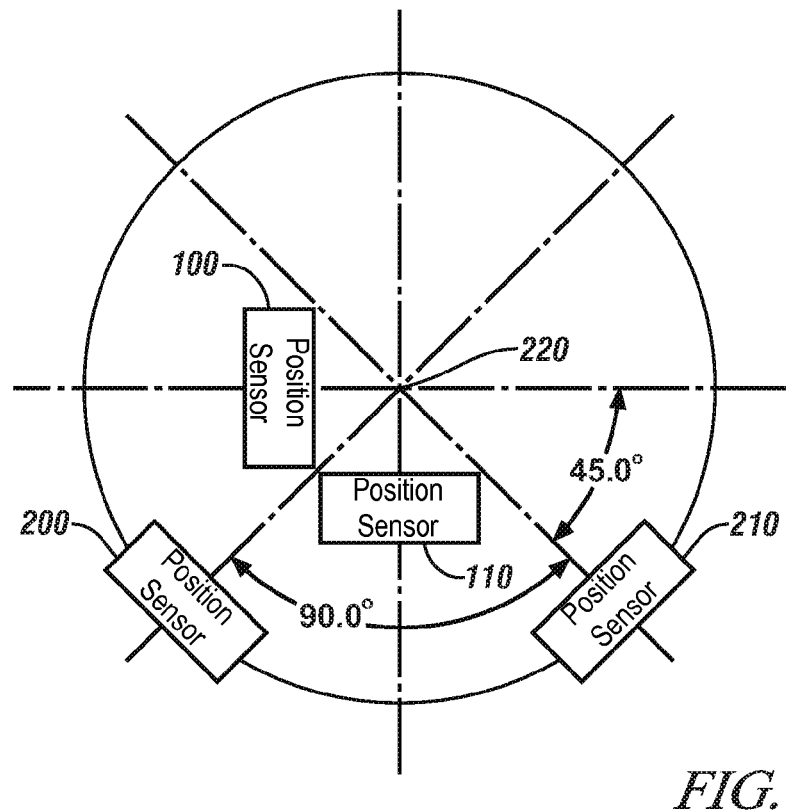
FIG. 5 is a schematic illustrating exemplary positions of position sensors utilized in the diagnostic system of FIG. 3 in accordance with an exemplary embodiment.

Referring to FIG. 5, in one exemplary embodiment, the third and fourth position sensors 200, 210 are positioned such that sensors 200, 210 are disposed at a known angle, such as 45° or another calibrated angle, from the first and second position sensors 100, 110; and thus the output signals TC_Sin, TC_Cos are at a known offset angle, such as 45° or the other calibrated angle, from the output signals from the first and second position sensors 100, 110. As shown, the third and fourth position sensors 200, 210 are angularly disposed 45 degrees from the position sensor 110 relative to the central axis 220 and 90 degrees apart from one another.

Figure 6:
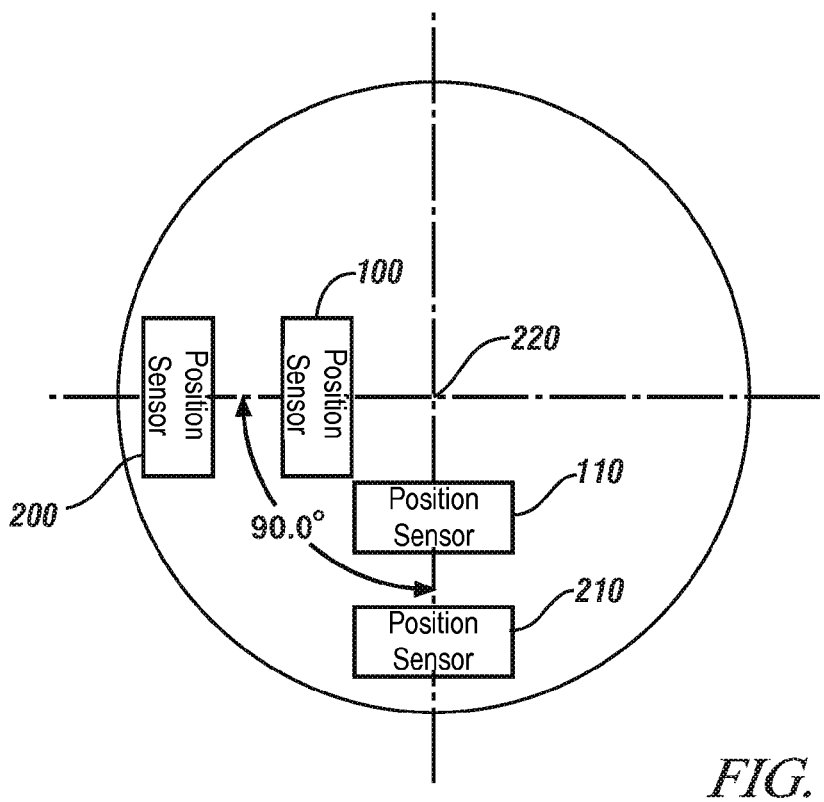
FIG. 6 is a schematic illustrating other exemplary positions of position sensors utilized in the diagnostic system of FIG. 3 in accordance with another exemplary embodiment.

Referring to FIG. 6, in an alternative embodiment, the position sensors 100, 200 are positioned such that sensors 100, 200 are disposed at an identical angle relative to the central axis 220. Also, the position sensors 110, 210 can be disposed at another angle relative to the central axis 220 that is offset 90° from the position of the sensors 100, 200, and thus the output signals TC_Sin, MPS_Sin would be in phase with one another and the output signals TC_Cos and MPS_Cos would be in phase with one another.

Figure 7:
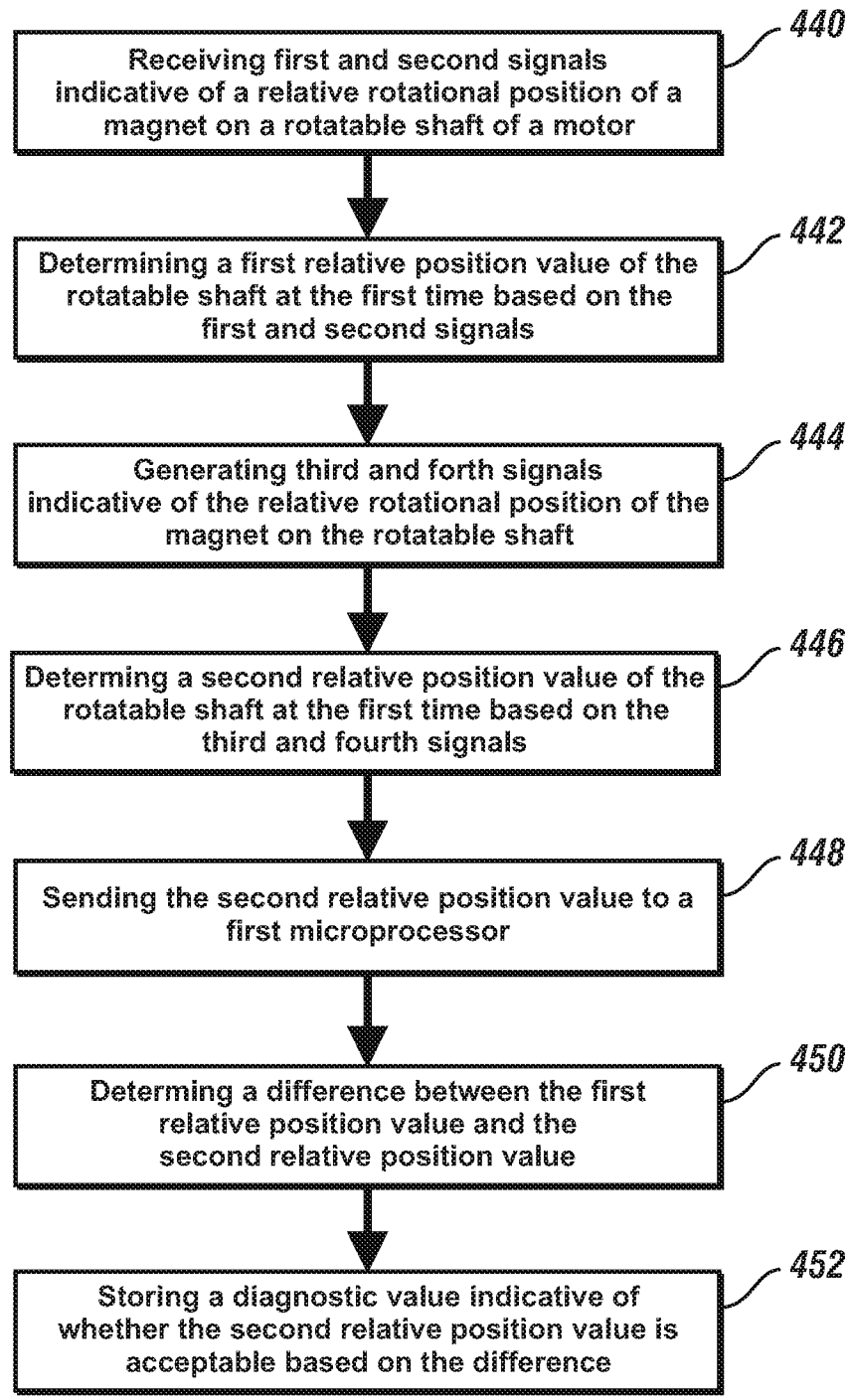
FIG. 7 is a flowchart of a diagnostic method in accordance with another exemplary embodiment.

Referring to FIG. 7, a flowchart of a diagnostic method for the electric power steering system 30 in accordance with another exemplary embodiment will be explained.

At step 440, the first microprocessor 400 receives the first and second signals from first and second position sensors 100, 110, respectively, disposed in the motor 80 of the electric power steering system 30. The first and second signals are indicative of a relative rotational position of the magnet 92 on the rotatable shaft 90 of the motor 80.

At step 442, the first microprocessor 400 determines a first relative position value (P1) indicating the relative rotational position of the rotatable shaft 90 at the first time based on the first and second signals. In one exemplary embodiment, the first relative position value (P1) is determined utilizing the following equation: first relative position value (P1)=ArcTan (first signal/second signal).

At step 444, the third and fourth position sensors 200, 210 generate third and fourth signals, respectively, indicative of the relative rotational position of the magnet 92 on the rotatable shaft 90. The third and fourth position sensors 200, 210 are disposed proximate to the rotatable shaft 90 and outside of the motor 80.

At step 446, the second microprocessor 300 receives the third and fourth signals and determines a second relative position value (P2) indicating the relative rotational position of the rotatable shaft 90 at the first time based on the third and fourth signals. In one exemplary embodiment, the second relative position value (P2) is determined utilizing the following equation: second relative position value (P2)=ArcTan (third signal/fourth signal).

At step 448, the second microprocessor 300 sends the second relative position value (P2) to the first microprocessor 400.

At step 450, the first microprocessor 400 determines a difference between the first relative position value (P1) and the second relative position value (P2).

At step 452, the first microprocessor 400 stores a diagnostic value in a memory device 402 indicative of whether the second relative position value (P2) is acceptable based on the difference between the first relative position value (P1) and the second relative position value (P2).

Referring to FIGS. 2-4, an advantage of the diagnostic system 40 will now be explained. In particular, if only the microprocessor 300 and position sensors 200, 210 were utilized, terminals of the position sensors 200, 210 could be undesirably shorted together and the microprocessor 300 would not be able to determine the inaccuracy of the second relative position value (P2) in the motor angle region 1 shown in FIG. 4. Also, if only the microprocessor 400 and position sensors 100, 110 were utilized, terminals of the position sensors 100, 110 could be undesirably shorted together and the microprocessor 400 would not be able to determine the associated inaccuracy of with the first relative positions value (P1). However, by utilizing the microprocessor 300 and position sensors 200, 210, and the microprocessor 400 and position sensors 100, 110, the first relative position value P1 can be compared with the second relative position value P2 to verify the accuracy of the second relative position value P2.

The diagnostic system 40 and the diagnostic method for the electric power steering system provide a substantial advantage over other system and methods. In particular, the diagnostic system 40 and the diagnostic method provide a technical effect of generating a diagnostic value indicative of whether a relative position value of a rotatable shaft is accurate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A diagnostic system for an electric power steering system, comprising:
    a first microprocessor configured to receive first and second signals from first and second position sensors, respectively, disposed in a motor of the electric power steering system, the first and second signals being indicative of a relative rotational position of a magnet on a rotatable shaft of the motor, the first microprocessor further configured to determine a first relative position value indicating the relative rotational position of the rotatable shaft at a first time based on the first and second signals;
    third and fourth position sensors disposed proximate to the rotatable shaft and outside of the motor, the third and fourth position sensors configured to generate third and fourth signals, respectively, indicative of the relative rotational position of the magnet on the rotatable shaft;
    a second microprocessor configured to receive the third and fourth signals and to determine a second relative position value indicating the relative rotational position of the rotatable shaft at the first time based on the third and fourth signals;
    the second microprocessor further configured to send the second relative position value to the first microprocessor; and
    the first microprocessor further configured to determine a difference between the first relative position value and the second relative position value; and
    the first microprocessor further configured to store a diagnostic value in a memory device indicative of whether the second relative position value is acceptable based on the difference between the first relative position value and the second relative position value.

2. The diagnostic system of claim 1, wherein the second relative position value is acceptable if the difference is less than a threshold value.

3. The diagnostic system of claim 1, wherein the second relative position value is not acceptable if the difference is greater than or equal to the threshold value.

4. The diagnostic system of claim 1, wherein the third and fourth position sensors are disposed 90 degrees apart from one another about a central axis of the rotatable shaft.

5. The diagnostic system of claim 4, wherein the third and fourth position sensors are angularly disposed 45 degrees from the first position sensor relative to the central axis and 90 degrees apart from one another.

6. The diagnostic system of claim 1, wherein the third and fourth position sensors are angularly disposed at first and second angles, respectively, that are 90 degrees apart from one another relative to the central axis, and the first and second position sensors being disposed at the first and second angles, respectively.

7. The diagnostic system of claim 1, wherein the first, second, third, and fourth position sensors are Hall effect sensors.

8. A diagnostic method for an electric power steering system, comprising:
    receiving first and second signals from first and second position sensors, respectively, disposed in a motor of the electric power steering system, utilizing a first microprocessor, the first and second signals being indicative of a relative rotational position of a magnet on a rotatable shaft of the motor;
    determining a first relative position value indicating the relative rotational position of the rotatable shaft at a first time based on the first and second signals utilizing the first microprocessor;
    generating third and fourth signals from third and fourth position sensors, respectively, disposed proximate to the rotatable shaft and outside of the motor, the third and fourth signals being indicative of the relative rotational position of the magnet on the rotatable shaft;
    receiving the third and fourth signals at a second microprocessor and determining a second relative position value indicating the relative rotational position of the rotatable shaft at the first time based on the third and fourth signals, utilizing the second microprocessor;
    sending the second relative position value from the second microprocessor to the first microprocessor;
    determining a difference between the first relative position value and the second relative position value, utilizing the first microprocessor; and
    storing a diagnostic value in a memory device indicative of whether the second relative position value is acceptable based on the difference between the first relative position value and the second relative position value, utilizing the first microprocessor.

9. The diagnostic method of claim 8, wherein the second relative position value is acceptable if the difference is less than a threshold value.

10. The diagnostic method of claim 8, wherein the second relative position value is not acceptable if the difference is greater than or equal to the threshold value.

11. The diagnostic method of claim 8, wherein the third and fourth position sensors are disposed 90 degrees apart from one another about a central axis of the rotatable shaft.

12. The diagnostic method of claim 11, wherein the third and fourth position sensors are angularly disposed 45 degrees from the first position sensor relative to the central axis and 90 degrees apart from one another.

13. The diagnostic method of claim 8, wherein the third and fourth position sensors are angularly disposed at first and second angles, respectively, that are 90 degrees apart from one another relative to the central axis, and the first and second position sensors being disposed at the first and second angles, respectively.

* * * * *